Jan. 19, 1937.　　　　J. P. FREED　　　　2,068,406
FLUID FLOW CONTROL APPARATUS
Filed Oct. 21, 1935
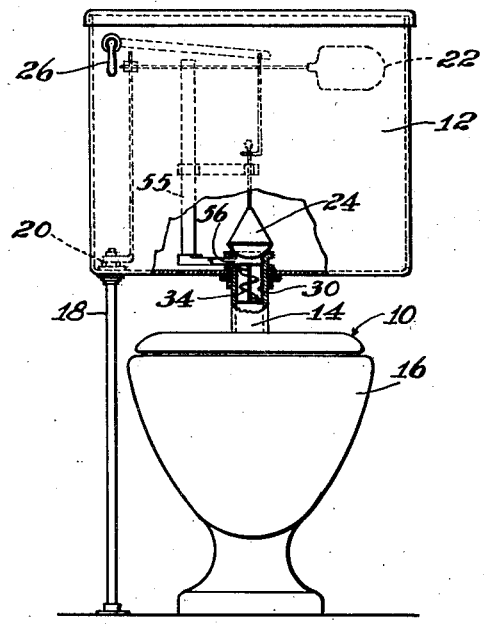
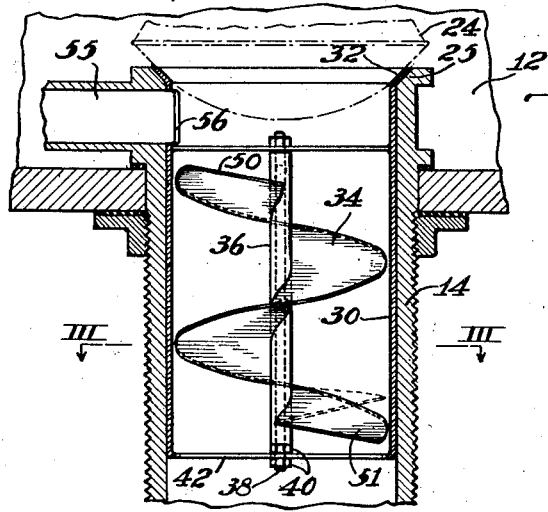
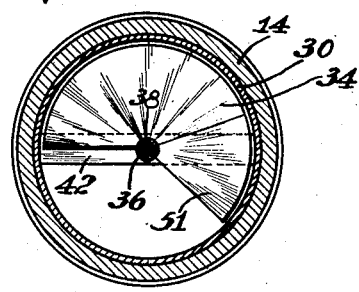
WITNESSES
*A B Wallace*
*A H Oldham*
INVENTOR.
*Joseph P. Freed*
BY *Brown, Critchlow & Flick*
his ATTORNEYS Patented Jan. 19, 1937

2,068,406

UNITED STATES PATENT OFFICE 2,068,406

FLUID FLOW CONTROL APPARATUS

Joseph P. Freed, Los Angeles, Calif., assignor to Edith F. Freed, Los Angeles, Calif.

Application October 21, 1935, Serial No. 45,850

9 Claims. (Cl. 4—52)

This invention relates to means for controlling and silencing the flow of fluids, such as water, and more particularly is concerned with apparatus for economizing on the amount of water, and for reducing noise in the use of lavatory fixtures.

In fluid flow through conduits the sudden stopping, high pressures, and sharp turns, for example, have resulted in objectionable noises in the conduits. Heretofore it has been proposed to employ sieves and filters for controlling and silencing fluid flow. I have found however that these devices are objectionable as they generally clog up quickly in use and must often be removed and cleaned. Likewise rather than controlling the flow of fluid they more often choke up the flow even when new so that the desired quantity of water is not obtained. Moreover the longer the devices remain in the conduit the less becomes the flow of fluid past them due to the aforementioned clogging action so that the amount of fluid they pass is constantly changing.

An improvement upon the known types of silencers and flow controls is described and claimed in my Patent No. 1,887,295, issued November 8, 1932. My present invention constitutes a further improvement in the silencing and flow control of fluids and avoids and eliminates the objectionable features of prior devices as set forth above. More specifically my inventions are adapted for fluid flow control and silencing in lavatory fixtures such as water-closets.

In my copending application Serial No. 37,371, filed August 22, 1935, I disclose and claim mechanism particularly adapted for controlling and silencing fluid flow in pressure-type water-closets and herein I disclose and claim apparatus best suited for use with box-type water-closets.

It is the general object of my invention to provide inexpensive, easily installed, long-wearing and non-clogging means for controlling and silencing fluid flow.

Another object of my invention is the provision of apparatus which can be placed in the usual box water-closet without special tools or experience and without changing the toilet structure and which operates to reduce the noise of operation and control the flow of water in the flushing operation.

The foregoing and other objects of my invention are achieved by providing mechanism which includes a rotatable screw pivotally mounted in a cylindrical shell so that the axes of the screw and shell are substantially coinciding. In use with a box-type water-closet the silencing and flow control unit is placed in the conduit connecting the box and the bowl so that the flow of water through the conduit rotates the screw whereby the exact flow of water to the bowl to obtain the proper flushing action follows and so that the noise of the operation of the closet is reduced.

In the accompanying drawing, Fig. 1 is a front elevation partly in section of a box-type water-closet incorporating the controlling and silencing unit of my invention; Fig. 2 is an enlargement of a portion of Fig. 1 to better illustrate the construction of one embodiment of the unit of my invention; and Fig. 3 is a cross-sectional view taken on line III—III of Fig. 2.

Although the metering and silencing unit of my invention is broadly useful in many relations for controlling and silencing fluid flow it is particularly adapted for operation with box-type water-closets. Therefore the invention has been illustrated in the drawings in conjunction with a box water-closet and will be so described.

Referring specifically to the drawing and to Fig. 1 thereof the numeral 10 indicates a box-type water-closet of standard and usual design which includes the box or tank 12 connected by the pipe 14 to the bowl 16. Associated with the tank 12 are the feed-in conduit 18, the shut-off valve 20 operated by the float 22, and the ball valve 24 sealing off the pipe 14 at seat 25 and operated by the hand lever 26.

As shown best in Figs. 2 and 3 the illustrated embodiment of the fluid control and silencing unit of my invention includes a cylindrical shell 30 having a close sliding fit in the pipe 14 and having an inclined flange 32 at the upper end of the shell which rests on the valve seat 25. I contemplate making the flange 32 relatively short and with a tapered edge so that the ball valve 24 seats both against the flange and the seat 25. However, with the flange 32 constructed as shown in the drawing no difficulty with leakage has been experienced.

Positioned in the shell 30 and pivotally mounted therein is a rotatable screw 34. I preferably form the screw 34 of a sheet metal strip soldered to a hollow tube 36. The screw is pivotally supported so that its axis is substantially coincident with that of the shell and to this end the tube 36 is rotatably carried by a rod 38 fastened at its ends by lock nuts 40 to spanner bars 42 formed integral with or soldered to shell 30.

It will be seen that the screw 34 just clears the walls of the shell 30 so that in the flow of fluid through the unit the screw revolves on its axis. The particular pitch of the screw as well as the clearance between the shell and the screw can be varied in the construction of the unit so that the best flow for any definite type of installation is forthcoming.

However, I further provide means on the unit for adjusting the character of flow and in the form of the invention illustrated the means comprise bent ends 50 and 51 on the screw 34. As shown in Figs. 2 and 3 the ends 50 and 51 can be bent by hand or with pliers to change the pitch of the screw. I likewise contemplate hinging the ends 50 and 51 to the remainder of the screw with screw-adjusting means controlling the positions of the hinged portions.

As seen in Fig. 2 the standard box-type water-closet is ordinarily provided with an overflow conduit 55 which is connected to the pipe 14 below the valve seat 25 as shown. I accordingly provide a suitable slot 56 in the shell 30 adjacent the overflow conduit 55 so its operation is not impaired.

It is believed that the operation of the silencing and flow control unit of my invention will be evident from the foregoing description. Suffice it to add that the unit is installed in the ordinary water-closet merely by dropping it in place in the pipe 14 when the ball valve 24 is moved out of the way. The flange 32 on the shell 30 fits down on the valve seat 25 and the ball valve 24 seals against it as heretofore explained. Thus the entire operation of adding my unit to the water-closet requires only a few seconds, no tools and can be performed by the layman following simple instructions.

In use when the ball valve 24 is lifted by the operating handle 26 to flush the closet the flow of water through the pipe 14 is controlled and silenced by my unit as the screw 34 is rotated by the water. The exact amount of flow to obtain the proper flushing action is determined by the pitch of the screw and by the angle the ends 50 and 51 of the screw make with the body of the screw. The rotation of the screw eliminates sudden stopping or surging of the water flow and gives a smooth steady flushing action whereby the noise of the water flow is materially reduced as well as the quantity of water required for the flushing operation.

The various parts of my unit are preferably made of corrosion-resisting materials, such as brass, copper, stainless steel, aluminum or the like. In addition, I contemplate employing non-metallic materials, namely, rubber, glass, porcelain, bakelite or other moldable plastics.

From the foregoing it will be evident that the objects of the invention have been achieved by the provision of a metering and silencing unit for fluid flow which is non-clogging, long-wearing and easily installed by an inexperienced person and more particularly a unit adapted for use with a water-closet without change to the closet structure.

Broadly my invention teaches the use of my fluid flow unit for metering and silencing the flow of fluids of various kinds and in different relations. The screw 34 can be changed in such manners as will occur to those skilled in the art without departing from the spirit of the invention so long as a rotatable member turning on an axis parallel to the direction of flow is used. The cylindrical shell 30 can be made as a cage or wire frame support so long as the rotatable screw is properly supported so as to be rotated by the fluid flow.

In accordance with the patent statutes one embodiment of and application of the invention has been illustrated and described in detail. However, it should be recognized that my invention is not limited thereto or thereby but is defined in the appended claims.

I claim:

1. The combination with a box-type water-closet having a short pipe connecting the bowl with the box and with a ball valve sealing off the flow of water from the box through the pipe, of a flow control and silencing unit positioned in the pipe, said unit including a cylindrical shell having a close sliding fit in the pipe, an inclined flange on the upper end of the shell and seating on the seat for the ball valve and a spiral screw made from sheet material pivotally carried in the shell with the axis of the screw substantially coinciding with the axis of the shell whereby the flow of water through the shell and pipe is controlled and silenced by the rotation of the screw.

2. The combination with a box-type water-closet having a short pipe connecting the bowl with the box and with a ball valve sealing off the flow of water from the box through the pipe, of a flow control and silencing unit positioned in the pipe, said unit including a shell having a close sliding fit in the pipe, an inclined flange on the upper end of the shell and seating on the seat for the ball valve, and a screw pivotally carried in the shell with the axis of the screw substantially coinciding with the axis of the shell whereby the flow of water through the shell and pipe is controlled and silenced by the rotation of the screw.

3. The combination with a box-type water-closet having a short pipe connecting the bowl with the box and with a ball valve sealing off the flow of water from the box through the pipe, of a flow control and silencing unit positioned in the pipe, said unit including a shell having a close sliding fit in the pipe, an inclined flange on the upper end of the shell and seating on the seat for the ball valve, and a screw pivotally carried in the shell whereby the flow of water through the shell and pipe is controlled and silenced by the rotation of the screw.

4. The combination with a box-type water-closet having a short pipe connecting the bowl with the box and with a ball valve sealing off the flow of water from the box through the pipe, of a flow control and silencing unit positioned in the pipe, said unit including a screw pivotally carried in the unit whereby the flow of water through the pipe is controlled and silenced by the rotation of the screw.

5. The combination with a box-type water-closet having a short pipe connecting the bowl with the box and with a ball valve sealing off the flow of water from the box through the pipe, of a flow control and silencing unit positioned in the pipe, said unit having an element rotated by the flow whereby the flow of water through the pipe is controlled and silenced by the rotation of the element, and means associated with the element for changing the effective resistance of the element.

6. In combination, a conduit, a cage having a close sliding fit in the conduit, a rotatable member journaled in the cage with the axis of the member being substantially coincident with the axis of the conduit, said member having means contacting and rotated by any fluid flowing through the conduit so that the rotation of the member controls and silences the fluid flow.

7. The combination with a pipe, of a flow control and silencing unit positioned in the pipe, said unit including a cylindrical shell having a close sliding fit in the pipe, and a spiral screw made from sheet material pivotally carried in the shell with the axis of the screw substantially coinciding with the axis of the shell whereby the flow of water through the shell and pipe is controlled and silenced by the rotation of the screw.

8. The combination with a pipe, of a flow control and silencing unit positioned in the pipe, said unit including a cylindrical shell having a close sliding fit in the pipe, a spiral screw made from sheet material pivotally carried in the shell with the axis of the screw substantially coinciding with the axis of the shell whereby the flow of water through the shell and pipe is controlled and silenced by the rotation of the screw, and means associated with the screw for changing the pitch of the screw.

9. The combination with a box-type water-closet having a short pipe connecting the bowl with the box and with a ball valve sealing off the flow of water from the box through the pipe, of a flow control and silencing unit positioned in the pipe, said unit having an element rotated by the flow whereby the flow of water through the pipe is controlled and silenced by the rotation of the element.

JOSEPH P. FREED.